United States Patent [19]

Jourdan et al.

[11] 4,211,161
[45] Jul. 8, 1980

[54] MACHINE TOOLS AND MACHINE FOR REMOVING STEM FROM VEGETABLE, SUCH AS CABBAGE OR CAULIFLOWER

[76] Inventors: Louis J. Jourdan, 36, rue de Dinan, 35120 Dol de Bretagne; Jean M. Saillour, Lieu dit "Beauregard", Plouenan, both of France

[21] Appl. No.: 887,544

[22] Filed: Mar. 17, 1978

[51] Int. Cl.² .................... A23N 15/02; A47J 21/00
[52] U.S. Cl. ........................................ 99/638; 99/643; 130/30 R
[58] Field of Search .......... 99/559, 560, 565, 637–639, 99/642, 643; 130/30 R

[56] References Cited
U.S. PATENT DOCUMENTS

| 3,754,470 | 8/1973 | Console | 99/643 |
| 4,099,456 | 7/1978 | Cornish | 99/643 |

FOREIGN PATENT DOCUMENTS

| 1081280 | 8/1967 | United Kingdom | 99/638 |
| 1093252 | 11/1967 | United Kingdom | 99/638 |
| 1366302 | 9/1974 | United Kingdom | 99/638 |

Primary Examiner—Harvey C. Hornsby
Assistant Examiner—Timothy F. Simone
Attorney, Agent, or Firm—Laff, Whitesel & Rockman

[57] ABSTRACT

There is described a stump removing tool particularly designed for separating cauliflower flowerets from the stump thereof. It may also be useful for coring cabbages. The tool comprises a cylinder having an upper cutting edge and a nose piece, the apex of which includes meridian blades having cutting edges. When the nose piece is penetrating into the cauliflower head, the base of which is placed on the cylinder, the cauliflower flowerets are spread while the meridian blades first cut the cauliflower head center into tapers; then, the inside cylinder cut the stump into tapers which fall. A machine is also described which comprises a conveyor belt adapted to be advanced step by step, the belt carrying regularly spaced tool cylinders, and a vertical frame. A slide is in the frame and over the mounted tool nose pieces. The machine operates so that, at each stop of the belt, a series of cylinders is located under a series of nose pieces of the slide and the slide is moved down into operation position, then moved up while the belt advances by a next step.

12 Claims, 12 Drawing Figures

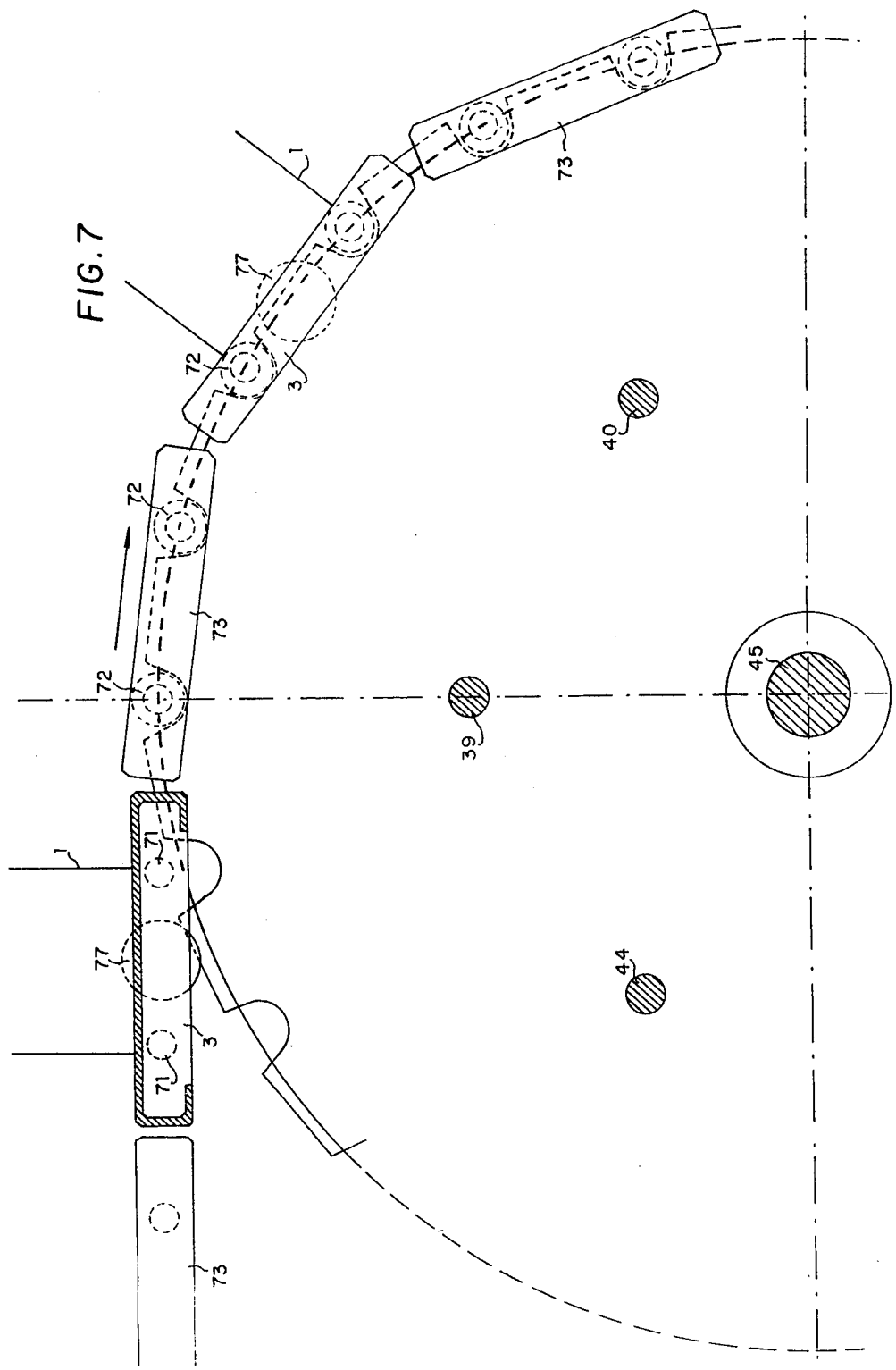

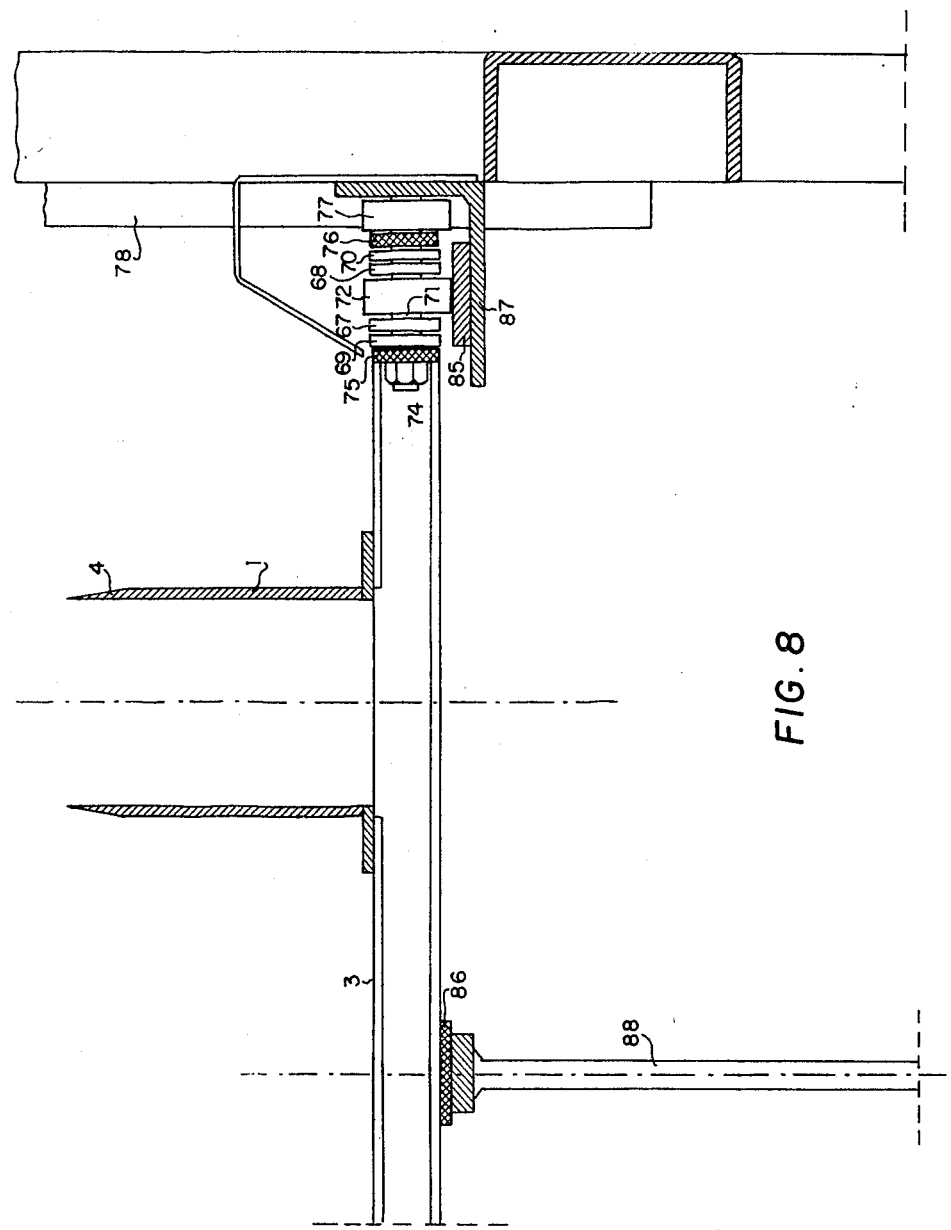

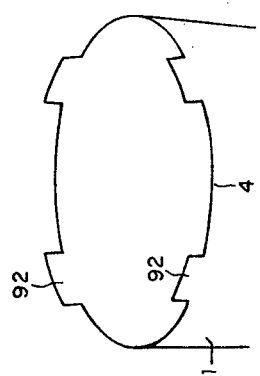
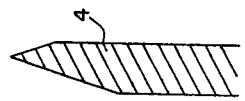
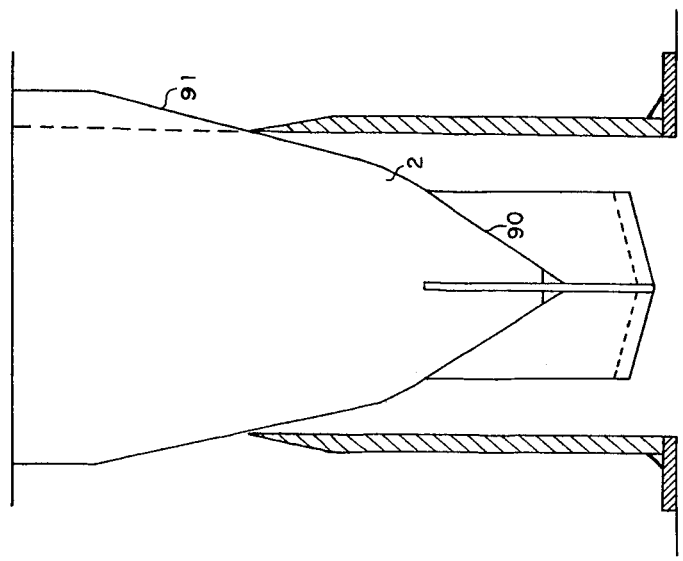
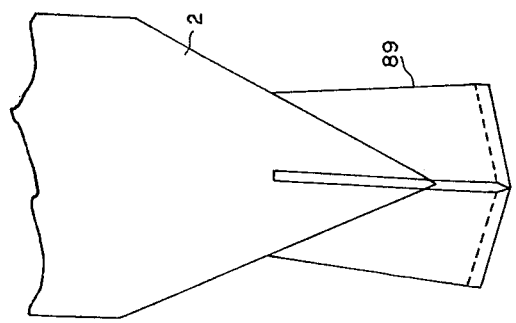

MACHINE TOOLS AND MACHINE FOR REMOVING STEM FROM VEGETABLE, SUCH AS CABBAGE OR CAULIFLOWER

The present invention relates to tools utilizable for and a method of separating a vegetable stump from the rest of the vegetable and in particular, in a cauliflower, for separating its stump from the flowerets. The invention also relates to a machine which has tools according to the invention, and which permits an automatized separation of the stumps.

In the following description, reference will be made more particularly to the separation of the stumps of cauliflowers from the flowerets. However, it must be realized that the invention can be applied to other vegetables of the substantially the same structure such as, for example, cabbages.

It is well known to deep freeze cauliflowers. Of the cauliflowers, it is especially the inflorescences, more commonly called the flowerets, which are of interest to consumers, since the stumps are not very edible. It is therefore preferable to remove the stump before proceding with the deep-freezing of a cauliflower. Practically, the present operation of separation of the stump is manual labor. The flowerets are scalded and pass into a deep-freezing tunnel before being put into packets. Now, the manual separation of the stump is time consuming work and increases the cost of the deep frozen cauliflowers. Therefore, there has been a long-felt need to automatize this stump separation operation. Methods are known in which a cylinder with a cutting edge at one end is passed through a cauliflower along the axis of the stump, the cylinder diameter corresponding to the diameter of the stump.

This method achieves a separation of the stump but entails the loss of the flowerets portion which is in alignment with the stump. Furthermore, in such a method the flowerets are not separated into bunches automatically. Therefore, an additional manual operation must still be provided.

One object of the present invention is to provide a tool for and a method of removing the stump from cauliflowers which do tools and not have the drawbacks of the methods mentioned above. Another object is to reduce the losses and simplify the operations of removal of the stump and providing the flowerets in bunches time of reducing the costs and losses at the time of the preparation of the cauliflowers, before their deep-freezing.

According to one aspect of the invention, a stump removing tool comprises a cylinder having an upper cutting edge and a nose piece at its point with separating blades. The cylinder and the nose piece are coaxially arranged so that the point of the nose piece is directed towards the cylinder. The tool has edges of the blades turned towards the cylinder, the edges being above the top of the cylinder. A cauliflower is placed on the cylinder, with the stump thereof inside the cutting edge of the cylinder, which supports the base of the head of the cauliflower. The nose piece blades are lowered towards the top of the head of the cauliflower penetrating the same and spreading the flowerets of the top. The blades cut the center of the head into tapers. Then the blades penetrate into the cylinder to detach the stump which falls through the cylinder whilst the flowerets of the tapers scatter around the cylinder.

According to another aspect of the invention, a stump removing tool comprises two elements namely a first element defining an aperture on which the stump of a cauliflower can locate and having a cutting edge which extends around the stump when it is so located. A separating and second element is in the form of a plug for penetrating into the head of the cauliflower to spread it laterally and outside the cutting edge, and to engage the cutting edge to sever the stump from the head.

According to another aspect of the invention, a method of removing the stump of a cauliflower from the head thereof comprises using a first element defining an aperture in which the stump of a cauliflower can pass. The element has a cutting edge which extends around the stump. A separating and second element is in the form of a plug. The first and second elements are moved together with the stump being located in the aperture of the first element. The two elements engage each other to sever the stump from the head, which away from is spread outwardly of the cutting edge, by the second element.

According to another aspect of the invention there is a machine comprises a conveyor belt adapted to be advanced step by step, the belt carrying, at regular intervals, tools as aforesaid. The machine includes a vertical frame in which is movably mounted a slide. Under slide are mounted the tool nose pieces, stump evacuating means and a cut floweret conveying means. The operation of the machine is such that, at each stop of the belt, a series of cylinders is located under the series of nose pieces of the slide. The slide descends into the working position of the nose pieces and then ascends into a raised position, while the belt advances by one step. The entries of the evacuation means are under the cylinders which are, on stopping under the slide. The band gathers the cut flowerets transported by the belt, the cauliflowers each being placed on a cylinder in front of the working position and under the slide.

The features mentioned above as well as other features of the invention will appear more clearly on reading the following description of various embodiments of tools and one embodiment of a machine the description being made in respect of the attached drawings, in which:

FIG. 7 is a view in an enlarged scale of a part of a chain of the belt of FIG. 3;

FIG. 8 is a diagrammatic view in cross section of a base plate of the belt of FIG. 3;

FIGS. 9 to 11 are views in section, showing variations of the tool of FIG. 1; and FIG. 12 is a view in section of a variation of the cylinder edge.

Figure 1:
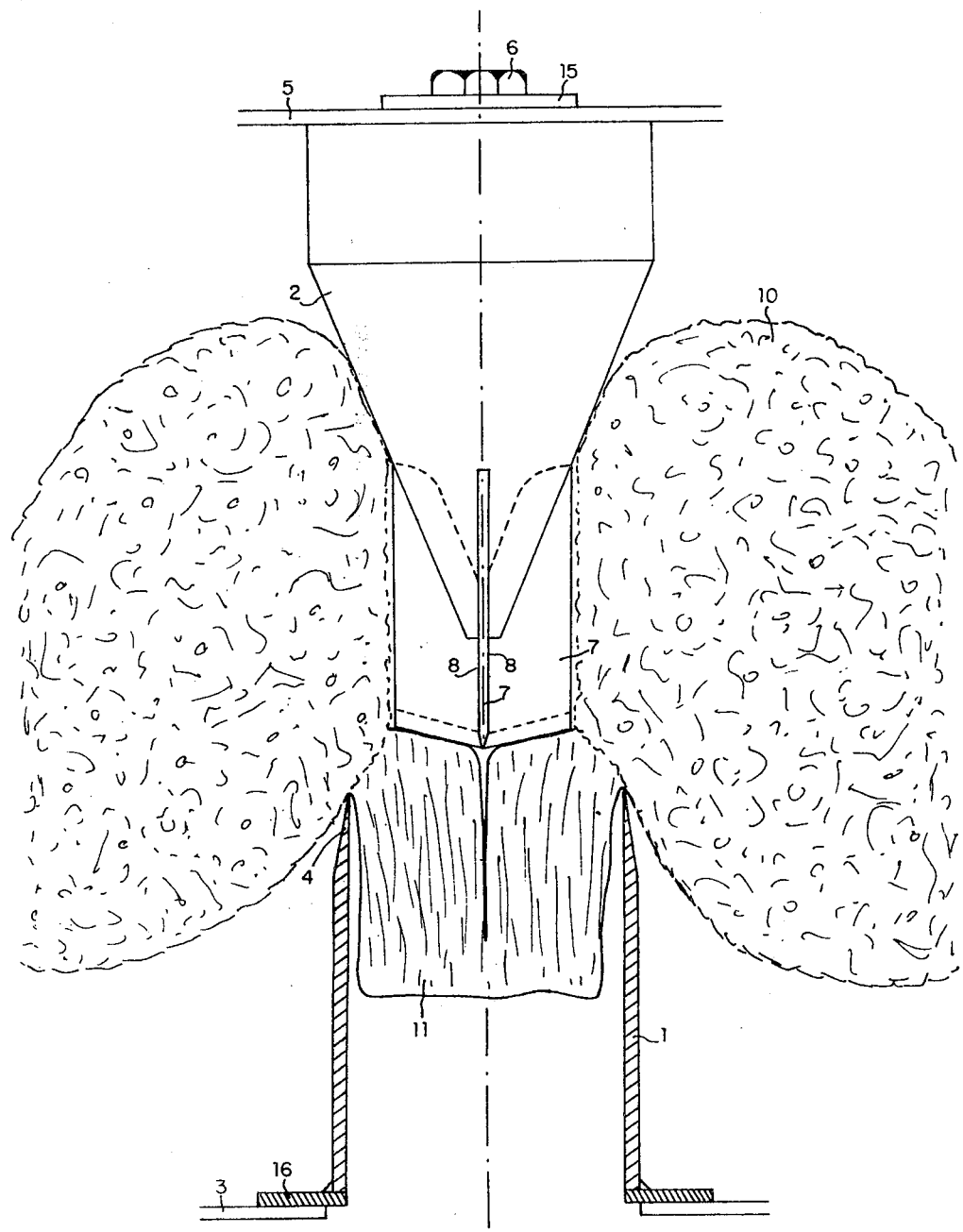
FIG. 1 is an elevation view, partly in vertical section, of a tool according to the invention; the nose piece of the tool is shown penetrating into the head of a cauliflower.

In FIG. 1, the tool shown is composed of two parts, on the one hand there is a cylinder end 1 and on the other hand there is a conical nose piece 2. The cylinder 1 is open at its two ends and mounted on a base plate 3 by conventional fixing means. The upper edge 4 of the cylinder 1 has its outer flank chamferred to form a circular cutting edge. The nose piece 2 is attached to and mounted under the lower part of a slide 5, by a conventional fixing means 6. The nose piece 2 has vanes or blades 7, which are four in number in the embodiment shown, although this number may be different from four. Each vane 7 is mounted in a radial slot of the nose piece 2 and is welded to the nose piece at the edges of the slot. The vanes 7 are joined at 8 where they meet along the axis of the nose piece and are welded together along their adjacent parts. The lower edge 9 of each vane 7 is chamfered in order to define a cutting edge. The inner diameter of the cylinder 1 is large enough for most cabbage or cauliflower stumps to be able to pass freely therethrough. The diameter of the largest part of the nose piece 2 is greater than that of the cylinder 1. The cylinder 1 and the nose piece 2 are coaxial.

To effect the removal of the stump 11 of a cauliflower 10, the slide 5 is raised vertically, taking along with it the nose piece 2, up to a height which permits an easy placing of the cauliflower 11 on the edge 4. The stump 11 of the cauliflower is engaged in the cylinder 1. Next, the slide 5 with the nose piece 2 is caused to descend vertically onto the head of the cauliflower 11. The cutting edges 9 of the vanes 7 begin to cut slots in the cauliflower. Then, as FIG. 1 shows, the point of the nose piece 2 spreads the head of the cauliflower along the slots. The edges 9 then reach the top of the stump 10. Finally, the outer surface of the nose piece 2 reaches the cutting edge 4 of the cylinder 1 as FIG. 2 shows, thus separating completely the stump sections 11, enclosed in the cylinder 1, from the floweret sections or bunches 12 which are scattered on the base plate 3 around the cylinder 1.

Experience shows that the cuts caused by the edges 9 of the vanes 7 and the edge 4 of the cylinder 1 in the head of the cauliflower have the combine effect of breaking the flowerets into small pieces which are easy to put into bags before deep freezing them.

Figure 2:
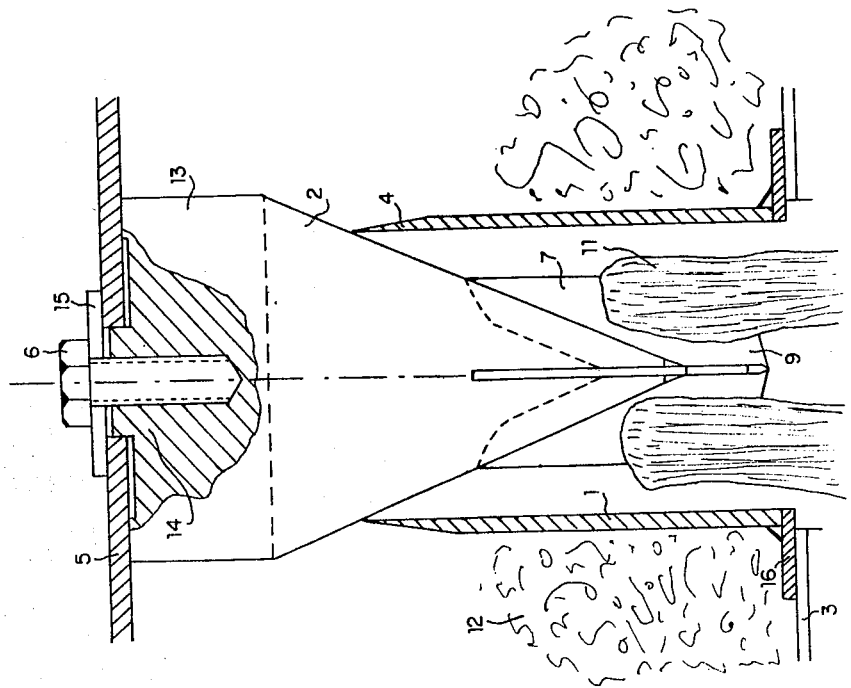
FIG. 2 is a view, partly in vertical section, of the tool of FIG. 1 with the nose piece having reached its lowest point of travel.

By way of indication, the nose piece 2, FIG. 2, may be mounted on a solid cylindrical base 13 comprising a collar 14 which is lodged in a hole of the lower part of the slides mounting is shown here simply by using a washer 15 and a screw 6 screwed into a turned hole tapped in the base 13.

For best operation of the tool, it is necessary for the vertical axes of the nose piece 2 and of the cylinder 1 to be coincident so that there is no space between the surface of cone 2 and the edge 4 in the position indicated in FIG. 2. The mounting of the cylinder 1 on the plate 3 may be effected using screw-nut systems passing through holes which are slightly out of round and are in plate 3 or the lower collar 16 of the cylinder 1.

Figure 3:
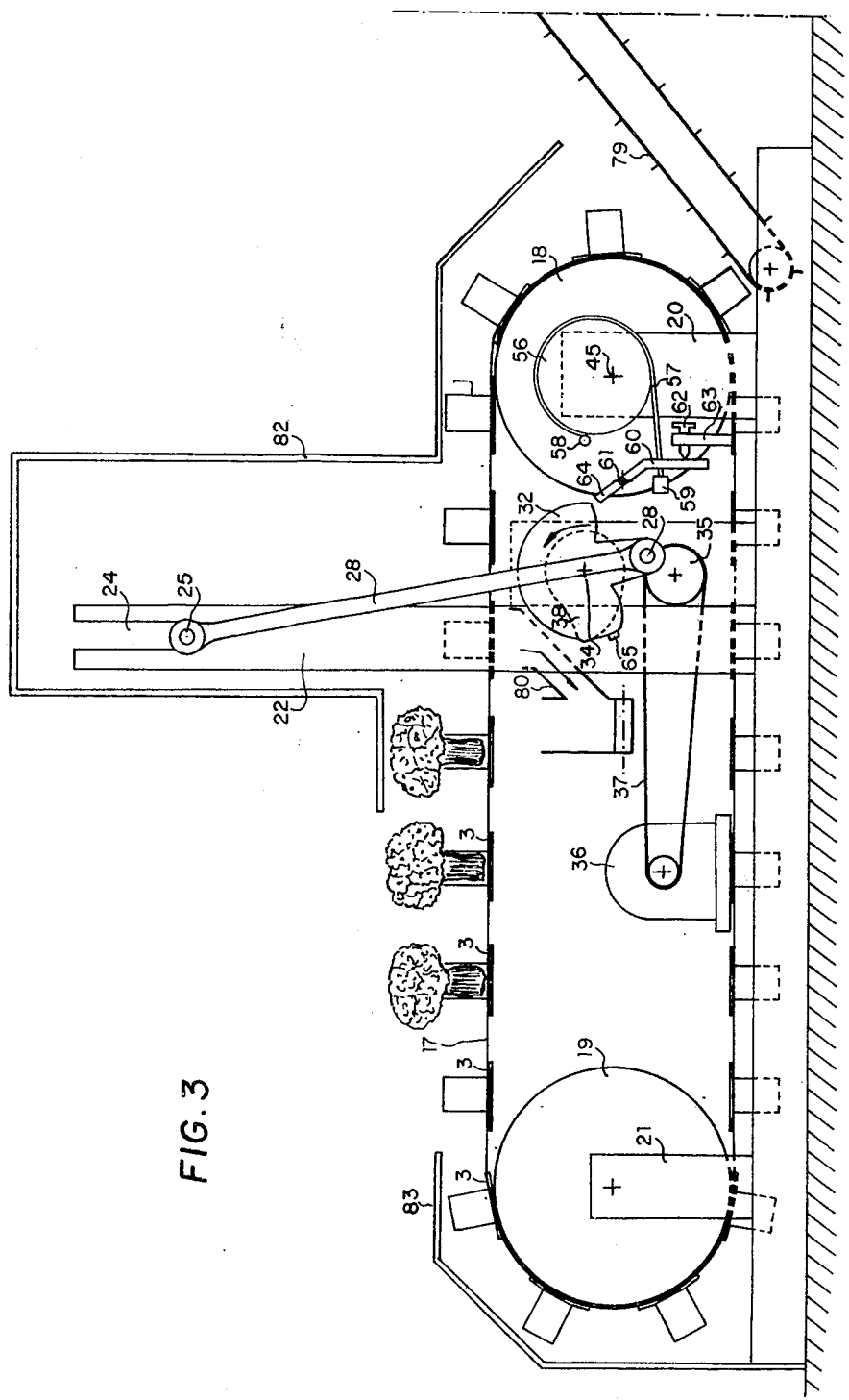
FIG. 3 is a diagrammatic view in longitudinal vertical section of a machine according to the invention.
Figure 4:
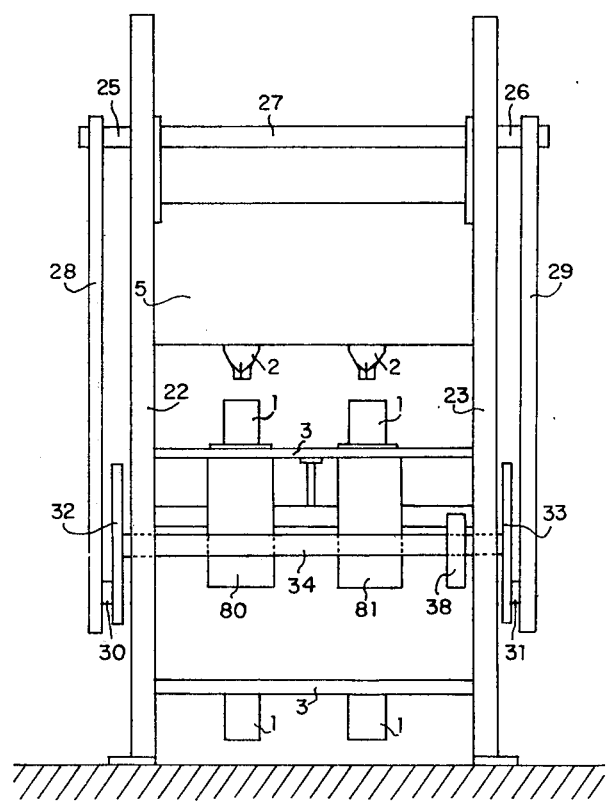
FIG. 4 is a diagrammatic view in cross section of the machine of FIG. 3, taken along the line IV—IV.

The machine shown diagrammatically in FIGS. 3 and 4 comprises an endless conveyor belt 17 constituted by a series of plates. Each alternate plate is a base plate 3. Each base plate 3 carries two cylinders 1. The belt 17 is driven by two coaxial pinions 18 of large diameter and is guided by two coaxial pinions 19 of the same diameter as 18. The shafts respectively connecting the pinions 18 and to the pinions 19 are mounted on the uprights 20 and 21 forming part of the frame of the machine which is only shown in part so as not to confuse the drawing.

The frame also comprises two uprights 22 and 23 (FIG. 4) which have at their upper ends guide slots 24 (FIG. 3) which serve to guide the end bearings 25 and 26 of an axle 27. Suspended on axle 27 and suspended between the uprights 22 and 23 and is a slide 5. Under the slide 5 are mounted two nose pieces 2. The bearings 25 and 26 are respectively coupled to heads of rods 28 and 29 mounted at the ends of the uprights 22 and 23 in respect of the slide 5. The lower ends of the rods 28 and 29 are respectively coupled to the crank-pins 30 and 31 of two plate cranks 32 and 33. The plate cranks 32 and 33 are mounted on the ends of a shaft 34 which passes through the frame of the machine. The shaft 34 is adapted to be driven continuously by a speed reduction assembly shown diagrammatically at 35, this assembly itself being driven by a motor 36, such for example, as an electric motor, and a transmission belt 37.

Figure 5:
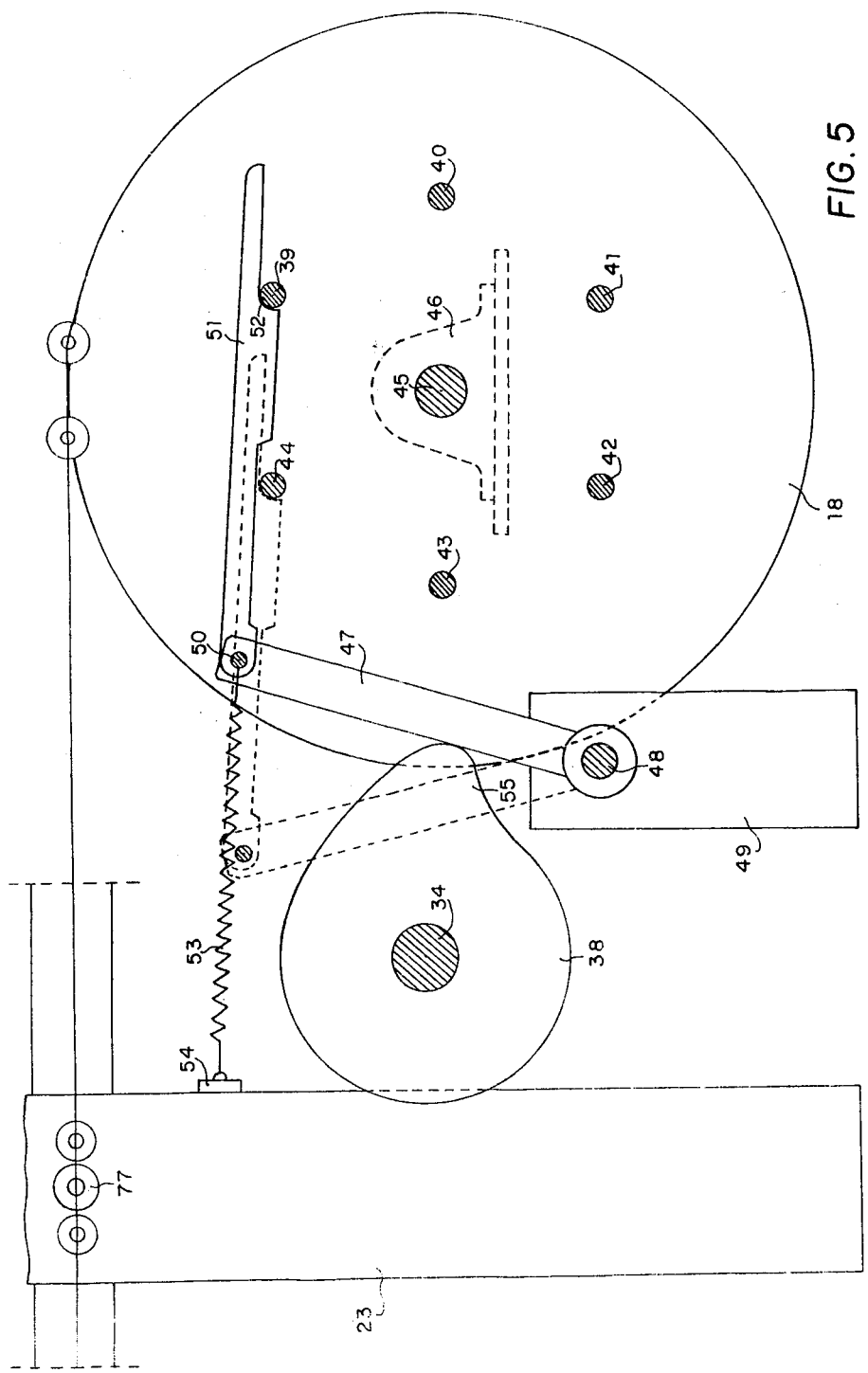
FIG. 5 is a diagrammatic view of parts of the step by step advancing means of the belt of the machine of FIG. 3.

The shaft 34 also carries a cam 38 which serves to cause the pinions 18 to turn step by step as FIG. 5 shows. The coaxial pinions 18 rotate as a unit since they are interconnected by cross bars 39 to 44 and have their common axle 45 mounted on bearings 46 carried by the uprights 20. A lever arm 47 is mounted for pivoting about an axle 48 mounted on an upright 49 of the frame at its free end, arm 47 carries an axle 50, around which one end of a finger 51 pivots, the other end of which has a shoulder 52 which engages the bar 39. The axle 50 is subjected to the action of a return spring 53 hooked onto the frame as, for example, to a cross piece 54 fixed on the upright 23. In the resting position, the assembly of the arm 47 and of the finger 51 takes up the position indicated by broken lines. When the cam 38 turns in the direction of the arrow, driven by the shaft 34, its beak 55 pushes back the arm 47. The rotation of arm 57 causes an advancing of the finger 51, the shoulder of which pushes the engaged bar 39 as FIG. 5 indicates. With disengagement of the cam 38 from arm 47, the spring 53 brings back the finger 51 and the arm 47 into the resting position and the shoulder 52 of the finger 51 engages the bar 44. At the next turn of the cam 38, the bar 44 will be moved to the position occupied by the bar 39 in FIG. 5 as above described. In practice, it is found that due to the inertia of the pinions 18 and 19 and of the belt 17, the bar pushed by the finger 51 tends to go beyond the position indicated in FIG. 5, by the bar 39. To obviate this overshooting, a system for braking the rotation of the pinion 18 is provided, which is shown in FIG. 3. At the end of the axle 45 on the outside of the upright 20 is fixed a brake drum 56, a large part of the circumference of which is in contact with a brake band 57. One end 58 of the brake band 57 is hooked on to a fixed point of the frame whilst the other end 59 is hooked to a lever arm 60 which can pivot about an axle 61 mounted on the frame. The point of a screw 62, which is supported on an upright 63 of the frame, presses on the free end of arm 60 in order to tension more or less the brake band 57 and thus ensure a more or less strong braking of the drum 56. The lever 60 is extended beyond the axle 61 by an arm 64 which is struck by a boss 65 on the crank plate 32 once per turn of this latter. When the boss 65 strikes the arm 64, the lever 60 turns, tensioning much more the brake band 57 and applying an abrupt braking to the drum 56.

The structure of the endless belt 17 will now be described referring to FIGS. 7 and 8. In FIG. 7, there is shown again a pinion 18, the periphery of which has teeth 66, which are similar to a bicycle chain sprocket. The teeth 66 co-operate with chain links of bicycle type chains of which one is shown in section in FIG. 8. The coupling between two links of each of the chains comprises inside link plates 67–68 and the outer link plates 69–70 in FIG. 8. Each chain joint has an axle 71 joining two links and carrying a roller 72. The axle 71 is extended by a threaded rod which passes through the side wall 7 of each plate 3 or 73 (FIG. 7) and is connected to such plate by a nut 74 on said rod. The plates 3 and 73 are each constituted by a sheet of sheet-steel folded as shown in section in FIG. 7. Plates 73 are distinguished from plates 3 in that they do not carry any cylinders 1 and have only flat upper faces. Only the outer links of the chains carry plates 3 or 73 and plates 3 alternate with plates 73. When the trajectory of the belt 17 is horizontal, the plates 3 and 73 form a practically continuous horizontal surface.

Figure 6:
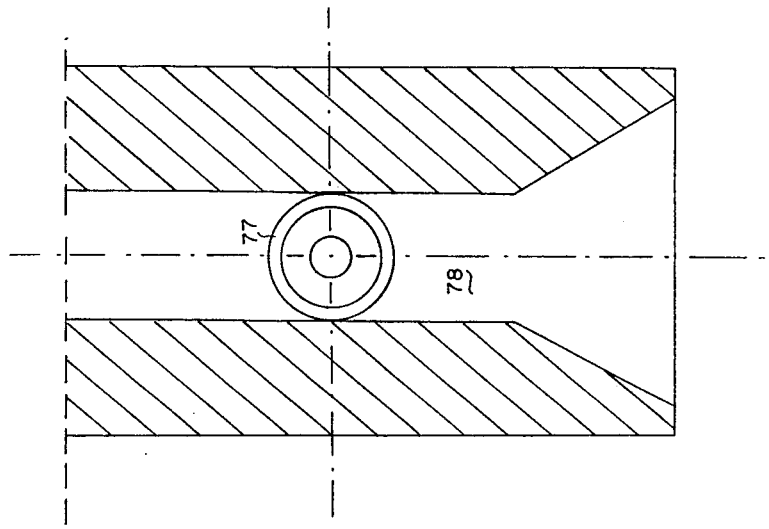
FIG. 6 is a diagrammatic view of positioning means of the machine shown in FIG. 3.

The teeth of the pinion 18 mesh with the rollers 72 of the chains. On the outside of the outer links 69–70 which carry plates 3 is fixed a small plate 76 which carries a horizontal axle roller 77 which is fixed to the centre of the small plate. The axle of the roller 77 intersects the vertical axes of the cylinders 1 of the plate 3 in question. As FIG. 6 shows, at the time of the descent of the slide 5, the roller 77 enters into a groove 78 provided in the slide 5.

The operation of the machine will now be described, taking as a starting point where the slide 5, having reached its lowest point begins to ascend again. Such point corresponds to the position shown in FIG. 3. The axle 34, rotating in the direction indicated by the arrow, the crank 30, pushed back the rod 28 (it is the same for 31 and 29) which lifts the slide 5 guided by the slots 24. After a certain angle of rotation, the cam 38 actuates the arm 47 (FIG. 5) and the finger 51 which causes a bar to advance and turn the pinion 18 by an angle corresponding to an arc the length of which is equal to the distance between the centers of two plates adjacent 3. In the example described, the angle of rotation is 60°, the diameter of the pinion 18 being such that the circumference of pinion 18 is equal to six steps of the belt 17. The movement of the pinion is braked when the finger 51 ceases to push a bar. Then, on the passage of the boss 65 on the arm 64, the braking is accentuated although the pinion is stopped. For its part, the slide 5 has then passed its high point and has commenced to descend. The lowest part of the slide 5 hits the groove 78 (FIG. 6) which engages the roller 77 of a plate 3 and centers it, this latter centering eventually taking the endless belt 17 slightly backwards. The axes of the nose pieces 2 of the slide 5 coincide then with the axes of the cylinder 1 of the appropriate plate 3. The cauliflowers which are fitted in the cylinders 1 then have their stumps separated as has been described in relation to the tool shown in FIGS. 1 and 2. The flowerets fall in bunches on the plate 3 and the adjacent plates 73 and are transported beyond the pinion 18 where they fall onto the elevator 79 which removes them to another station. In addition, the stumps fall from the cylinders 1 in the fixed spouts 80 and 81, provided for this purpose, under the belt 17 and are removed by a small conveyor.

A protective casing protects the rear part 82 (FIG. 3) and a protective casing protects the front part 83. Furthermore casings 84 are provided above the chains as FIG. 8 shows. It is to be noted that the supporting faces 85 and 86 are provided to support the plate 3 at the time of the working of the tools. In fact, the supporting face 85 is placed on an angle-iron 87 connected to the frame and supports the rollers 72. In addition, the surface 86, carried by an arm 88 fixed to the frame serves as a supporting block for the central part of the plates 3 and 73 which cannot be allowed to bend in their middle.

The machine has two work places located on both sides of the centre line of endless belt 17 between the ends of the casings 82 and 83. Safety devices may be provided at the entry of the casing 82 to avoid any introduction of fingers when the slide 5 descends towards its bottom point. The feeding of the motor 36 may be arranged so that it does not stop when the slide 5 is at its high dead center point once the stop switch of the motor is operated.

FIG. 9 shows a variation of the nose piece 2 of FIG. 1 in which the vanes have an oblique outer edge as indicated at 89, instead of being axial. FIG. 10 shows another variation of nose piece 2 formed by several nose cone sections, here a cone 90 and a cone frustum 91. The cone angle of the frustrum 91 is less, the cone angle that of the cone 90.

FIG. 11 shows a variation of a cylinder 1 in which spaced teeth 92 are provided on the edge 4. At the moment of placing a cauliflower on the cylinder 1, the teeth 92 penetrate into the periphery of the stump and keep the cauliflower on the cylinder in spite of the abrupt advancing movements of the endless belt 17. In such case, the nose piece 2 co-operating with the cylinder of FIG. 11 has on its surface recesses into which the teeth engage at the moment of cutting shown in FIG. 2.

Finally, FIG. 12 shows that the edge 4 may be defined by double chamfering in respect of the vertical to ensure a more efficacious cutting of each step.

Although the principles of the present invention have been described above in relation to the particular embodiment it must be understood that the description has only been given by way of example and is not intended to limit the broadest scope of the invention as defined by the appended claims.

What we claim is:

1. A cauliflower stump-removing and floweret-separating tool comprising a lower cylinder having an upper cutting edge, a conical nose piece positioned above the upper cutting edge of said cylinder and having a point with a plurality of downwardly dependent separating blades affixed thereto, the cylinder and the nose piece being coaxially arranged so that the blades and the point of the nose piece are directed along the central axis of the cylinder, means for supporting said nose piece and the cutting edges of the nose piece blades for movement toward and within the cylinder, whereby a cauliflower may be placed on the cylinder with the stump thereof being positioned inside the cylinder with the cutting edge of the cylinder positioned to engage the cauliflower along the circumferential periphery of the stump thereof when the head of the cauliflower is pressed into the cylinder, and means for lowering the nose piece with the nose piece blades moving toward, penetrating, and cutting an initial passageway through, the top of the head and continuing into the stump of the cauliflower so that the conical nose piece follows the initial passageway cut by said blades, whereby said nose piece spreads, separates, and cuts the flowerets of the said top, the blades penetrating into said cylinder with the tapered side of said conical nose piece engaging the cutting edge of the cylinder and thereby detaching the stump which falls through the cylinder while the flowerets of the individual sections scatter around the outside cylinder.

2. A tool according to claim 1, wherein the nose piece is formed by several sections each having at least a part of a conical surface thereon, the cone angles of said sections decreasing as the section is located further from the point of the nose piece.

3. A tool according to any one of the claims 1 or 2, wherein each blade has its cutting edge positioned substantially in front of the point of the nose piece and facing the cylinder.

4. A tool according to claim 1, wherein the blades form a first group with their central edges connected along the axis of the conical nose piece and ahead of the point of this said nose piece.

5. A tool according to claim 4, wherein the blades form a second group behind the point of the nose piece, the blades of the second group being displaced angularly with respect to those of the first group.

6. A machine according to any one of the claims 1 or 5 or 6, said machine comprising a conveyor belt mounted to be advanced step by step stopping after each step, the belt carrying, at regular intervals, said tool cylinders, said machine further including a vertical frame in which is movably mounted a slide for supporting, on an underside, a series of the tool nose pieces, stump-evacuating means and a cut floweret-conveying means, cauliflowers each being placed on a cylinder at a location in front of a working position under the slide means for operating the machine such that at each stop of said belt a series of said cylinders is located under the series of nose pieces mounted on said slide, means for moving the slide into said working position wherein the nose pieces enter the cylinder and then move out of Said working position while the belt advances by another step, entries of said evacuation means being under the cylinders when stopped under the slide, and band means for gathering the flowerets transported by the belt after their cutting.

7. A machine according to claim 6, wherein the slide is moved in the frame by a rod crank means, the axis of rotation of the crank means causing a cam means to turn which causes, on each rotation, the step-by-step advance of the belt between cycles of movement of the nose pieces mounted on the slide.

8. A machine according to claim 6, wherein the conveyor belt is constituted by two parallel chain means driven by two spaced pinions interconnected by a shaft, each of said chain means comprising carrier links with a base plate for mounting said cylinders, each base plate being supported by two carrier links respectively of the two chains, the base plates being open under the cylinders, and the shaft of the pinions of the chains being driven by said cam by means of a step-by-step advancing device.

9. A machine according to claim 8, wherein each carrier link of at least the chain means carries a roller which serves as a guide for a vertical slide bar connected to the slide means, the slide means engaging the roller in the course of the movement of the slide to its work position which centers the base plate with respect to the slide and consequently the cylinders with respect to the nose pieces of the slide.

10. A machine according to claim 8, wherein each base plate has two cylinders which may be loaded with two cauliflowers at two working points, said cylinders being respectively mounted on opposite sides of the center line of the belt.

11. A tool according to any one of the claims 2 or 4 or 5, wherein the cutting edge of the cylinder carries vertical teeth for engaging the stump of a cauliflower to hold it and the nose piece having recesses on its surface in which the teeth locate at the moment of closing the tool.

12. A cauliflower stump-removing tool comprising two cutting elements, namely a first element defining an aperture in which the stump of a cauliflower can be located and having a circular cutting edge which extends circumferentially around the periphery of the stump when so located, and a second and separating element fitting entirely within the circumference of said circular edge of the first element, said separating element including a plurality of cutting blades positioned at the leading end of said second element which first enters the aperture of the first element to cut the cauliflower head and the stump in directions perpendicular to the axis of said aperture, said second element following the cuts in the directions which said cuts penetrate into the head and stump of the cauliflower and along the path followed by said blades, to spread said cauliflower laterally outside the cutting edge of said first element, and to engage the said cutting edge to sever the stump from the head, thereby reducing said cauliflower to individual flowerets which scatter around the outside of said first element.

* * * * *